United States Patent
Tsuji

(10) Patent No.: US 7,912,254 B2
(45) Date of Patent: Mar. 22, 2011

(54) AUTOMATIC TRIMMING METHOD, APPARATUS AND PROGRAM

(75) Inventor: Tetsuya Tsuji, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 990 days.

(21) Appl. No.: 11/730,375

(22) Filed: Mar. 30, 2007

(65) Prior Publication Data

US 2007/0236762 A1 Oct. 11, 2007

(30) Foreign Application Priority Data

Mar. 30, 2006 (JP) .................................. 2006-093396

(51) Int. Cl.
*G06K 9/00* (2006.01)
(52) U.S. Cl. ........................................................ 382/118
(58) Field of Classification Search .................. 382/103, 382/115, 118, 218, 286, 298, 151
See application file for complete search history.

(56) References Cited

U.S. PATENT DOCUMENTS

| | | | | |
|---|---|---|---|---|
| 6,301,440 | B1* | 10/2001 | Bolle et al. ..................... | 396/128 |
| 6,680,745 | B2* | 1/2004 | Center et al. ................ | 348/14.16 |
| 7,457,432 | B2* | 11/2008 | Ai et al. ........................ | 382/103 |
| 7,583,294 | B2* | 9/2009 | Ray et al. .................... | 348/222.1 |
| 7,720,302 | B2* | 5/2010 | Aoyama ....................... | 382/255 |
| 2005/0057576 | A1* | 3/2005 | Shen et al. .................... | 345/619 |

FOREIGN PATENT DOCUMENTS

JP 2005-267454 A 9/2005

OTHER PUBLICATIONS

Computer translation of Japanese Patent Publication No. 2005-267454, pp. 1-8.*
Shihong Lao et al., "Fast Omni-Directional Face Detection", Meeting on Image Recognition and Understanding (MIRU2004), pp. II271-II276, 2004 and its translation.
Ming-Hsuan Yang et al., "Detecting Faces in Images: a Survey", IEEE Transactions on Pattern Analysis and Machine Intelligence, vol. 24, No. 1, pp. 34-58, 2002.

* cited by examiner

*Primary Examiner* — Daniel G Mariam
(74) *Attorney, Agent, or Firm* — Birch, Stewart, Kolasch and Birch, LLP

(57) ABSTRACT

Trimming is automatically performed on an image by inferring a person and a background in which the photographer of the image has interest. Facial images FP1 and FP2 are detected in a whole image P, and the vertical direction of the whole image P is judged based the facial images FP1 and FP2. Further, processing is performed using the information about the vertical direction to discriminate whether the composition of the whole image P is portrait-mode composition or landscape-mode composition. If it is judged that the facial image FP1 is positioned on the lower side of the whole image, and if a composition discrimination unit discriminates that the composition of the whole image P is landscape-mode composition, trimming is automatically performed using a trimming frame TG10 that has portrait-mode composition.

8 Claims, 5 Drawing Sheets

| FACIAL POSITION / COMPOSITION | LOWER SIDE | UPPER SIDE |
|---|---|---|
| PORTRAIT-MODE COMPOSITION | AUTOMATIC TRIMMING IS NOT PERFORMED | AUTOMATIC TRIMMING IS PERFORMED BASED ON THE SIZE OF FACIAL IMAGE FP |
| LANDSCAPE-MODE COMPOSITION | AUTOMATIC TRIMMING IS PERFORMED USING A TRIMMING FRAME FOR PORTRAIT-MODE COMPOSITION | |

AUTOMATIC TRIMMING METHOD, APPARATUS AND PROGRAM

BACKGROUND OF THE INVENTION

1. Field of the Invention

The present invention relates to an automatic trimming method and apparatus for automatically trimming, based on a face of a specific person, a whole image obtained by a digital camera or the like. The present invention also relates a program for the automatic trimming method and apparatus.

2. Description of the Related Art

A trimming method for producing a certificate photograph that is used to apply for a passport or a license or to prepare a resume or the like is well known. In the trimming method, a face in an image is enlarged or reduced to satisfy a standard for the certificate photograph, and trimming is performed so that the face is arranged at a predetermined position in the certificate photograph. Particularly, as techniques for detecting a face, eye or the like in a photograph image have been improved, an automatic trimming method has been proposed (for example, please refer to Japanese Unexamined Patent Publication No. 2005-267454). In the automatic trimming method, trimming is performed by detecting a face in a photograph image obtained by using a digital camera or the like and by setting a trimming area based on the detected face. In Japanese Unexamined Patent Publication No. 2005-267454, first, human faces are detected in a photograph image. Then, the position and size of a trimming area is set based on the position of each of the detected faces. Then, trimming is automatically performed based on the trimming area that includes all of the faces.

As described above, in Japanese Unexamined Patent Publication No. 2005-267454, a trimming frame is set by paying attention only to facial images. However, if a trimming frame is set by paying attention only to the facial images, there is a problem that even if a photographer thinks that the background of a photograph is a subject that is as important as a person or persons in the photograph, the background, in which the photographer has interest, is excluded from an image obtained by trimming in some cases. For example, the photographer thinks that the background is as important as a person when the photographer obtains a photograph of the person with a landmark, such as a castle, in the background.

SUMMARY OF THE INVENTION

In view of the foregoing circumstances, it is an object of the present invention to provide an automatic trimming method and apparatus for automatically performing trimming by inferring a person and a background in which a photographer has interest. It is also an object of the present invention to provide a program for the automatic trimming method and apparatus.

An automatic trimming method of the present invention is an automatic trimming method comprising the steps of:

detecting a facial image in a whole image;

judging the vertical direction of the whole image;

discriminating whether the composition of the whole image is composition of which the vertical dimension is longer than the horizontal dimension thereof (portrait-mode composition) or composition of which the horizontal dimension is longer than the vertical dimension thereof (landscape-mode composition);

judging whether the detected facial image is positioned on an upper side or on a lower side in the discriminated composition;

if it is judged that the facial image is positioned on the upper side of the whole image, trimming is performed by determining the size and the position of a trimming frame based on the size and the position of the facial image; and if it is judged that the facial image is positioned on the lower side of the whole image, and if it is discriminated that the composition of the whole image is landscape-mode composition, trimming is performed by setting a trimming frame of portrait-mode composition based on the position of the facial image.

An automatic trimming apparatus of the present invention is an automatic trimming apparatus comprising:

a face detection means for detecting a facial image in a whole image;

a vertical-direction judgment means for judging the vertical direction of the whole image;

a composition discrimination means for discriminating whether the composition of the whole image is composition of which the vertical dimension is longer than the horizontal dimension thereof (portrait-mode composition) or composition of which the horizontal dimension is longer than the vertical dimension thereof (landscape-mode composition);

a facial-position judgment means for judging whether the facial image detected by the face detection means is positioned on the upper side of the whole image judged by the vertical-direction judgment means or on the lower side of the whole image judged by the vertical-direction judgment means; and a trimming means for automatically performing trimming by setting a trimming frame based on the facial image detected by the face detection means, wherein if the facial-position judgment means judges that the facial image is positioned on the upper side of the whole image, the trimming means performs trimming by determining the size and the position of the trimming frame based on the size and the position of the facial image, and wherein if the facial-position judgment means judges that the facial image is positioned on the lower side of the whole image, and if the composition discrimination means discriminates that the composition of the whole image is landscape-mode composition, the trimming means performs trimming by setting a trimming frame of portrait-mode composition based on the position of the facial image.

An automatic trimming program of the present invention is an automatic trimming program for causing a computer to execute trimming, the program comprising the procedures for:

detecting a facial image in a whole image;

judging the vertical direction of the whole image;

discriminating whether the composition of the whole image is composition of which the vertical dimension is longer than the horizontal dimension thereof (portrait-mode composition) or composition of which the horizontal dimension is longer than the vertical dimension thereof (landscape-mode composition);

judging whether the detected facial image is positioned on an upper side or on a lower side in the discriminated composition;

if it is judged that the facial image is positioned on the upper side of the whole image, trimming is performed by determining the size and the position of a trimming frame based on the size and the position of the facial image; and if it is judged that the facial image is positioned on the lower side of the whole image, and if it is discriminated that the composition of the whole image is landscape-mode composition, trimming is performed by setting a trimming frame of portrait-mode composition based on the position of the facial image.

Here, the composition discrimination means is a means for discriminating whether the composition of a rectangular whole image is composition of which the vertical dimension is longer than the horizontal dimension thereof (portrait-mode composition) or composition of which the horizontal dimension is longer than the vertical dimension thereof (landscape-mode composition). The landscape-mode composition is, in other words, composition of which the vertical dimension is shorter than the horizontal dimension thereof.

Further, as long as the face detection means can detect a face in a whole image, a method adopted by the face detection means is not limited. For example, a well-known face detection technique, such as boosting algorithm and SVM (support vector machine) algorithm, may be adopted. Further, if a plurality of facial images is included in a whole image, all of the facial images in the whole image may be detected. Alternatively, only facial images of which the sizes are greater than or equal to a predetermined threshold value may be detected in the whole image.

Further, when the trimming means sets a trimming frame, the trimming means may adopt any kinds of method for setting the trimming frame. Particularly, the trimming means may set a trimming frame so that the ratio of the trimming frame with respect to the whole image becomes a predetermine ratio.

Further, if the facial-position judgment means judges that the facial image is positioned on the lower side of the whole image, and if it is judged that the composition of the whole image is portrait-mode composition, the trimming means may function so that trimming is not automatically performed.

Further, the vertical-direction judgment means may judge the vertical direction by detecting the sky or the ground in the whole image. Alternatively, the vertical-direction judgment means may judge that a direction extending from the center of a facial image toward the head portion of the facial image is the upper side.

In an automatic trimming method, apparatus and program of the present invention, a facial image is detected in a whole image, and the vertical direction of the whole image is judged. Further, processing is performed to discriminate whether the composition of the whole image is composition of which the vertical dimension is longer than the horizontal dimension thereof (portrait-mode composition) or composition of which the horizontal dimension is longer than the vertical dimension thereof (landscape-mode composition). Further, judgment is made as to whether the detected facial image is positioned on an upper side or on a lower side in the discriminated composition. If it is judged that the facial image is positioned on the upper side of the whole image, trimming is performed by determining the size and the position of a trimming frame based on the size and the position of the facial image. If it is judged that the facial image is positioned on the lower side of the whole image, and if it is discriminated that the composition of the whole image is landscape-mode composition, trimming is performed by setting a trimming frame of portrait-mode composition based on the position of the facial image. Therefore, it is possible to set a trimming frame by taking not only a person whom a photographer intends to photograph but also a background into consideration. Hence, it is possible to automatically perform trimming so as to reflect the intention of the photographer.

At this time, if the trimming means sets the trimming frame so that a ratio of the size of the trimming frame with respect to that of the whole image becomes a predetermined ratio, it is possible to prevent an image obtained by trimming from becoming too small.

Further, if the facial-position judgment means judges that the facial image is positioned on the lower side of the whole image, and if it is judged that the composition of the whole image is portrait-mode composition, the trimming means may function so that trimming is not automatically performed. If the trimming means does not automatically perform trimming, it is possible to prevent the trimming means from performing trimming in a manner that is not desired by the photographer. For example, if processing is performed in such a manner, when the photographer intentionally selected portrait-mode because he/she wanted to photograph the background together with the face, it is possible to prevent the trimming means from removing a part of the background or the entire background, which the photographer wanted to photograph.

Further, if the vertical-direction judgment means detects a head portion in a facial image and judges that the head-portion side is the upper direction, it is possible to efficiently judge the vertical direction.

Further, if the whole image includes a plurality of facial images, the face detection means may detect only a facial image or facial images of which the size or sizes is/are greater than a set threshold value in the whole image. If processing is performed in such a manner, it is possible to prevent a small facial image in which the photographer does not have interest from being included in the trimming frame. Hence, it is possible to automatically perform trimming by regarding a person in whom the photographer has interest as a main subject.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

DESCRIPTION OF THE PREFERRED EMBODIMENTS

Figure 1:
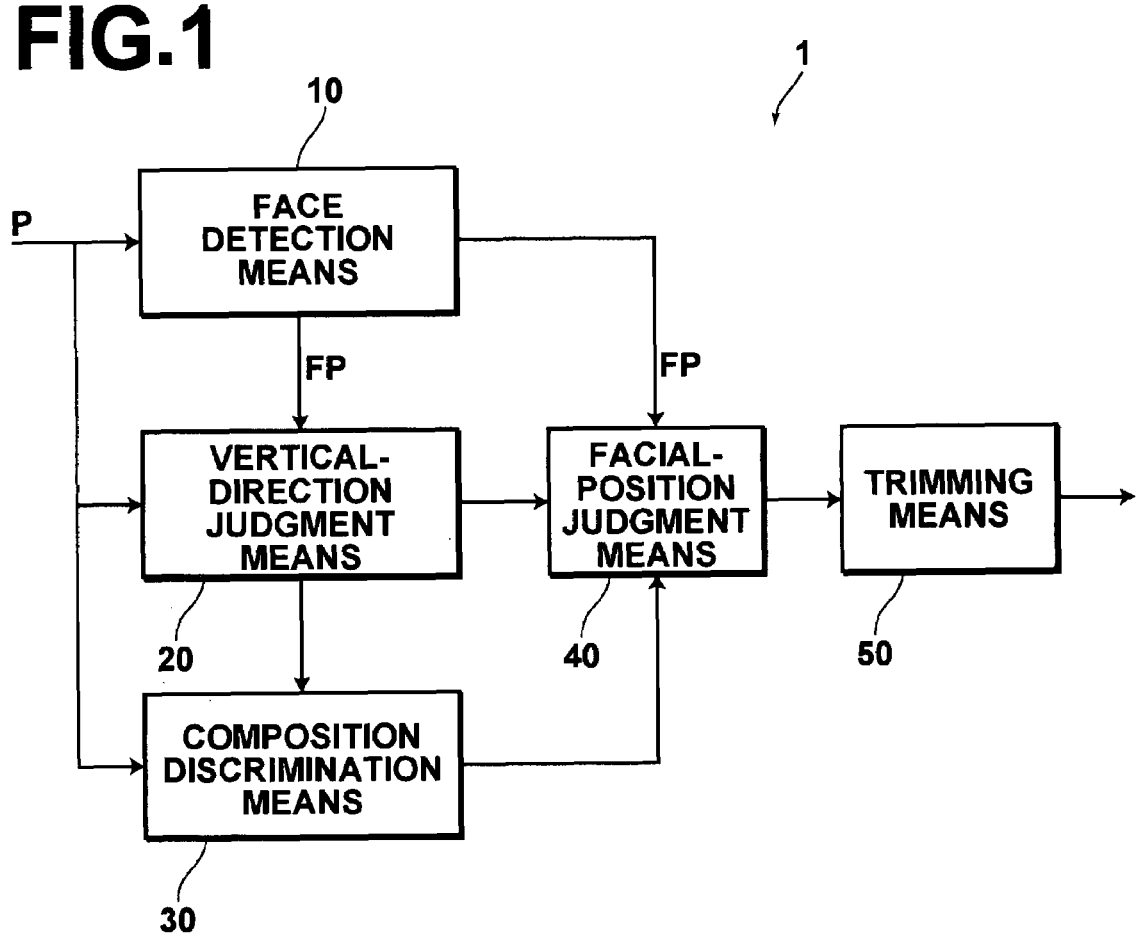
FIG. 1 is a block diagram illustrating an automatic trimming apparatus according to a preferred embodiment of the present invention.

Hereinafter, preferred embodiments of an automatic trimming apparatus of the present invention will be described in detail with reference to the attached drawings. The configuration of an automatic trimming apparatus 1, as illustrated in FIG. 1, is realized by causing a computer (for example, a personal computer or the like) to execute an automatic trimming program that has been read in an auxiliary storage device. At this time, the automatic trimming program is stored in an information storage medium, such as a CD-ROM, or distributed through a network, such as the Internet. Then, the automatic trimming program is installed in the computer. Alternatively, the automatic trimming program may be installed in a processor in a digital camera to realize the configuration of the automatic trimming apparatus 1.

The automatic trimming apparatus 1 includes a face detection means 10, a vertical-direction judgment means (top/bottom judgment means) 20, a composition discrimination means 30, a facial-position judgment means 40 and a trimming means 50. The face detection means 10 detects a facial image FP in a whole image P. The vertical-direction judgment means 20 judges the vertical direction (the top and the bottom) of the whole image P. The composition discrimination means 30 discriminates whether the composition of the whole image P is composition of which the vertical dimension is longer than the horizontal dimension thereof (portrait-mode composition) or composition of which the horizontal dimension is longer than the vertical dimension thereof (landscape-mode composition). The facial-position judgment means 40 judges whether the facial image FP is positioned on the upper side (sky-side or top-side) of the whole image P or on the lower side (ground-side or bottom-side) of the whole image P. The trimming means 50 automatically performs trimming by setting a trimming frame based on the position of the facial image. In other words, the trimming means 50 sets a trimming frame that is appropriate for the position of the facial image.

The face detection means 10 detects a face using known face detection algorithm, such as adaboosting algorithm, SVM (Support Vector Machine) algorithm and algorithm in a face detection method disclosed in Ming-Hsuan Yang, David J. Kriegman, Narendra Ahuja: "Detecting Faces in Images: a Survey", IEEE transactions on Pattern Analysis and Machine Intelligence, vol. 24, No. 1, pp. 34-58, 2002, for example. The adaboosting algorithm is disclosed in Shihong LAO, et al., "Fast Omni-Directional Face Detection", Meeting on Image Recognition and Understanding (MIRU2004), pp. II271-II276, 2004, or the like.

Figure 2:
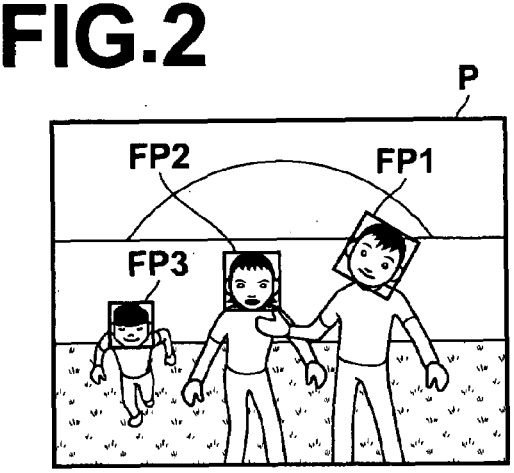
FIG. 2 is a schematic diagram illustrating a state in which facial images are detected in a whole image by a face detection means illustrated in FIG. 1.

Here, the face detection means 10 calculates the size of each of facial images FP detected in the whole image P and detects the largest facial image FP in the whole image P. The face detection means 10 sets a predetermined ratio (for example, 0.4 times) of the size of the largest facial image FP as a set threshold value. Then, the face detection means 10 excludes a facial image or facial images FP that is/are smaller than the set threshold value by judging that such a facial image or facial images is/are not detected as a facial image or facial images FP. For example, when three facial images FP1 through FP3 are present in a whole image P, as illustrated in FIG. 2, the face detection means 10 detects the three facial images FP1 through FP3. Further, the face detection means 10 detects the largest facial image FP1 of the three facial images FP1 through FP3. The face detection means 10 sets 0.4 times of the size of the facial image FP1 as the set threshold value. The face detection means 10 judges whether each of the facial images FP2 and FP3 is greater than the set threshold value. Then, the face detection means 10 regards the facial image FP3 that is smaller than the set threshold value as undetected.

Accordingly, when automatic trimming is performed based on the position of a facial image FP, it is possible to prevent the facial image FP3, which has a small size, and in which a photographer does not have interest, from being included in an image obtained by trimming. Specifically, it is possible to infer that when a photographer obtains a whole image P, he/she has interest in a face (human subject) represented by the largest facial image FP1 but he/she does not have interest in a face (human subject) represented by the small facial image FP3. Since the facial image FP3, which is inferred to be an image in which the photographer does not have interest, is not detected, it is possible to automatically set a trimming frame that reflects the intention of the photographer. In this example, the set threshold value is calculated based on the facial image FP. Alternatively, the set threshold value may be set in advance in the face detection means 10.

Figures 3, 4:
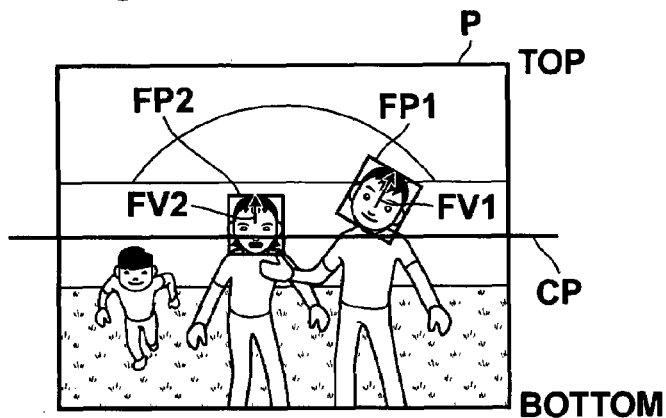
FIG. 3 is a schematic diagram illustrating a state in which a composition discrimination means illustrated in FIG. 1 has discriminated the vertical direction of the whole image and the composition of the whole image.
FIG. 4 is a table showing how a trimming means illustrated in FIG. 1 switches its trimming methods.

The vertical-direction judgment means 20 judges the vertical direction of the whole image P using the facial image FP detected by the face detection means 10. Specifically, as illustrated in FIG. 3, the vertical-direction judgment means 20 detects a facial vector FV1 in a facial image FP1, detected by the face detection means 10. The vertical-direction judgment means 20 also detects a facial vector FV2 in a facial image FP2, detected by the face detection means 10. The facial vector FV1 is a vector extending from the center of the facial image FP1 toward the head portion thereof, and the facial vector FV2 is a vector extending from the center of the facial image FP2 toward the head portion thereof. Next, the sum of all of the detected facial vectors (FV1+FV2) is obtained by calculation. Then, the vertical-direction judgment means 20 judges a direction of the largest vector component to be the upper side (sky side or top side) of the whole image P. The vertical-direction judgment means 20 judges a side opposite to the upper side to be the lower side (ground side or bottom side). As described above, judgment by the vertical-direction judgment means 20 is based on empirical law that a head is positioned on the upper side of an image. Since the vertical-direction judgment means 20 judges the vertical direction of the image using the facial images FP1 and FP2 in such a manner, the vertical-direction judgment means 20 can accurately judge the vertical direction in an efficient manner. It is not necessary that the vertical direction is judged by the aforementioned method using the facial images FP1 and FP2. Alternatively, the vertical direction may be judged by discriminating the sky or the ground, for example.

The composition discrimination means 30 has a function for discriminating, based on the information about the vertical direction obtained by the vertical-direction judgment means 20, whether the composition of the whole image P is composition of which the vertical dimension is longer than the horizontal dimension thereof (portrait-mode composition) or composition of which the horizontal dimension is longer than the vertical dimension thereof (landscape-mode composition). In the whole image P, which has an aspect ratio of a rectangle, if the dimension of the rectangle in the detected vertical direction is longer than that of the rectangle in the horizontal direction, the composition discrimination means 30 discriminates that the composition is portrait-mode composition. If the dimension of the rectangle in the vertical direction is shorter than that of the rectangle in the horizontal direction, the composition discrimination means 30 discriminates that the composition is landscape-mode composition.

The facial-position judgment means 40 judges, based on the information about the vertical direction obtained by the vertical-direction judgment means 20 and the information about the composition obtained by the composition discrimination means 30, whether the facial image FP detected by the face detection means 10 is positioned on the upper side of the whole image P or on the lower side of the whole image P. Specifically, the facial-position judgment means 40 uses a center line CP, which divides the whole image P into two with respect to the vertical direction. The facial-position judgment means 40 judges, based on the center line CP, whether the highest facial image FP (a facial image FP positioned closest to the top) of the facial images FP detected by the face detection means 10 is positioned on the upper side of the center line CP or on the lower side of the center line CP. For example, in the whole image P illustrated in FIG. 3, the facial-position judgment means 40 detects a facial image FP1 that is closest to the top. Then, the facial-position judgment means 40 judges, based on the center line CP, whether the facial image FP1 is positioned on the upper side of the center line CP or on the lower side of the center line CP. In FIG. 3, the facial-position judgment means 40 judges that the facial image FP1 is positioned on the upper side.

The trimming means 40 automatically performs trimming by setting a trimming frame TG based on the facial image FP detected by the face detection means 10. The trimming means 40 has a function for performing trimming by determining a trimming method based on the position of the facial image FP judged by the facial-position judgment means 40 and the composition of the whole image P discriminated by the composition discrimination means 30. Specifically, the trimming means 40 changes the trimming method, as illustrated in FIG. 4. The trimming means 40 changes the trimming method for each of three patterns (types), namely, a pattern in which the facial image FP is positioned on the upper side, a pattern in which the facial image FP is positioned on the lower side and the composition of the whole image P is portrait-mode composition and a pattern in which the facial image FP is positioned on the lower side and the composition of the whole image P is landscape-mode composition.

Figure 5A:
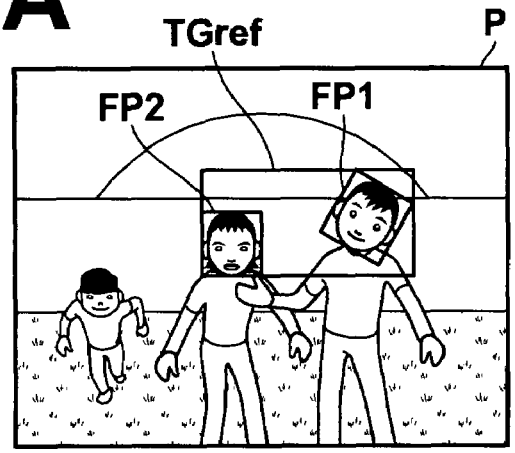
FIG. 5A is a schematic diagram illustrating an example of a trimming method when a facial image is positioned on the upper side of a whole image of landscape-mode composition.

If the facial image FP is positioned on the upper side, as illustrated in FIG. 5A, first, the trimming means 40 sets a facial area TGref so that all of the facial images FP1 and FP2 detected by the face detection means 10 are circumscribed by the circumference of the facial area TGref. The facial area TGref does not include the FP3, which is smaller than the set threshold value, and which was not detected by the face detection means 10.

Figure 5B:
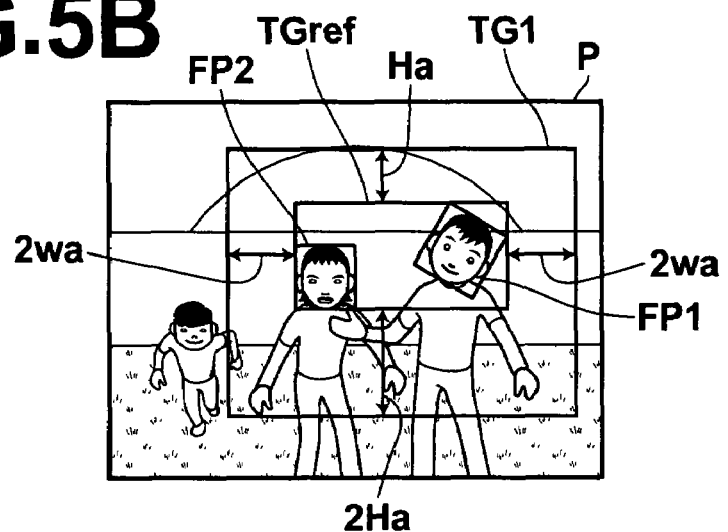
FIG. 5B is a schematic diagram illustrating an example of a trimming method when a facial image is positioned on the upper side of a whole image of landscape-mode composition.

Then, the trimming means 40 sets the size of a trimming frame TG1 based on an average value of the size of each of the plurality of facial images FP1 and FP2. Specifically, the trimming means 40 calculates an average value of facial images FP1 and FP2 in the longitudinal direction (vertical direction) and an average value of the facial images FP1 and FP2 in the lateral direction (horizontal direction). Then, as illustrated in FIG. 5B, the trimming means 40 adds a length that is a predetermined number of times of the calculated average value in the longitudinal direction to the length of the facial area TGref in the longitudinal direction. The trimming means 40 adds a length that is a predetermined number of times of the calculated average value in the lateral direction to the length of the facial area TGref in the lateral direction. Specifically, with respect to the upper direction (top side) of the facial area TGref, the trimming means 40 adds a length that is the same as an average value Ha of the facial images FP1 and FP2 in the longitudinal direction to the facial area TGref. With respect to the lower direction (bottom side) of the facial area TGref, the trimming means 40 adds a length that is twice (=2 Ha) the length of an average value Ha of the facial images FP1 and FP2 in the longitudinal direction to the facial area TGref. Further, with respect to each of the left side and the right side of the facial area TGref, the trimming means 40 adds a length that is twice (=2 Wa) the length of an average value Wa of the facial images FP1 and FP2 in the lateral direction to the facial area TGref. Consequently, a trimming frame TG1 in which the facial area TGref is positioned at the center with respect to the lateral direction, and in which the facial area TGref is positioned close to a position satisfying a so-called golden section ratio with respect to the vertical direction, is obtained.

Figure 5C:
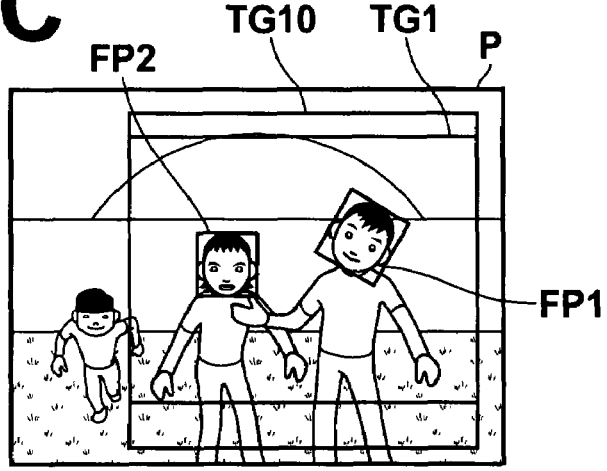
FIG. 5C is a schematic diagram illustrating an example of a trimming method when a facial image is positioned on the upper side of a whole image of landscape-mode composition.

If the aspect ratio of an image to be obtained by trimming has been set in advance, for example, by a user or the like, the trimming means 40 may set a trimming frame TG10, as illustrated in FIG. 5C. In FIG. 5C, the trimming frame TG10 is set by correcting the aspect ratio of the trimming frame TG1 so that the aspect ratio becomes the set aspect ratio. At this time, a ratio between a correction on the upper side and a correction on the lower side or a ratio between a correction on the left side and a correction on the right side in enlargement or reduction should be the same as the corresponding ratio adopted in obtainment of the trimming frame TG1. However, if any end of the trimming frame TG1, namely any one of the upper side, the lower side, the left side and the right side of the trimming frame TG1, reaches the end of the whole image P, an end of the trimming frame TG1 that is opposite to the end that has reached the end of the whole image P, and that has not reached any end of the whole image P, is extended so that the specified aspect ratio is satisfied.

Further, the trimming means 40 compares the size of the whole image P with that of the trimming frame TG1. If the ratio of the size of the trimming frame TG1 with respect to that of the whole image P is greater than or equal to a predetermined ratio (for example, 0.7 times), the trimming means 40 automatically performs trimming using the trimming frame TG1. If the ratio of the size is less than the predetermined ratio, the trimming means 40 may set a trimming frame TG10 by extending the trimming frame TG1 with respect to the vertical direction at the extension ratio of upper direction : lower direction=1:2 so that the ratio of the size becomes closer to the predetermined ratio. Accordingly, it is possible to prevent the size of an image obtained by trimming from becoming too small. If the ratio of the size of the trimming frame TG10 obtained by extending the trimming frame TG1 at the ratio of upper direction:lower direction=1:2 is substantially below the predetermined ratio, the extension ratio of upper direction:lower direction=1.5:3 or the extension ratio of upper direction: lower direction=2:4 is appropriately used so that the ratio of the size of the trimming frame TG10 becomes close to the predetermined ratio.

Figure 6:
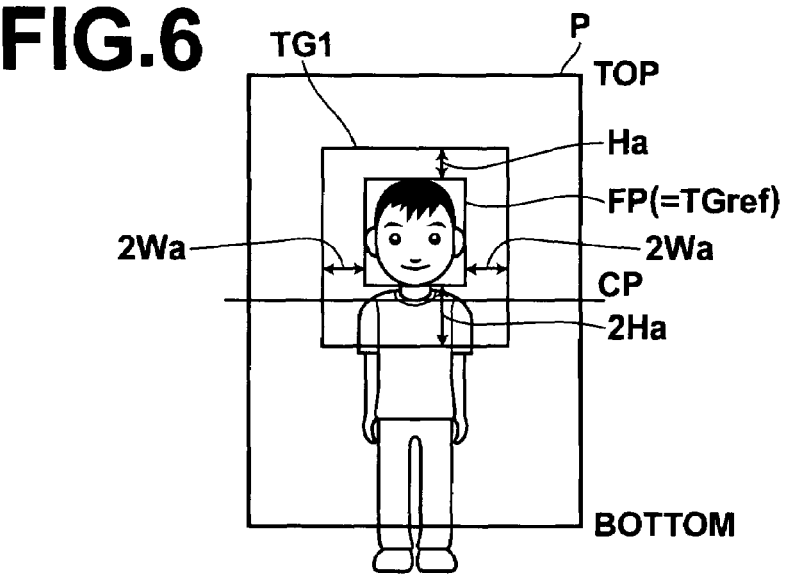
FIG. 6 is a schematic diagram illustrating an example of a trimming method when a facial image is positioned on the upper side of a whole image of portrait-mode composition.

In FIGS. 5A through 5C, a case in which the composition of the whole image P is landscape-mode composition is used as an example. However, even if the composition of the whole image P is portrait-mode composition, if the facial image FP is positioned on the upper side, as illustrated in FIG. 6, a trimming frame TG1 (TG10) is set by using a method similar to the method illustrated in FIGS. 5A, 5B and 5C, and trimming is automatically performed.

Figure 7:
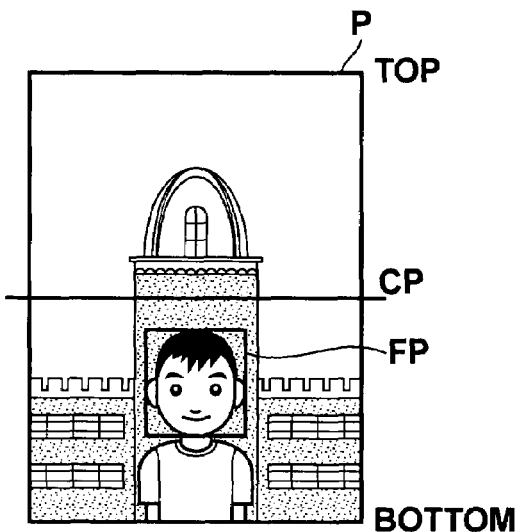
FIG. 7 is a schematic diagram illustrating an example of a trimming method when a facial image is positioned on the lower side of a whole image of portrait-mode composition.

Next, a case in which the facial image FP is positioned on the lower side will be described. Normally, when photography is performed, a face is positioned at the middle of the whole image P or on the upper side (top-side) of the whole image P. Therefore, if a photographer positioned a face on the lower side (bottom side) of the whole image P, it is possible to infer that the photographer wanted to photograph a background that is present on the upper side (top-side) of the face together with the face. Further, when the composition of the whole image P is portrait-mode composition, it is possible to infer that the photographer intentionally selected the portrait-mode so that a background that he/she wanted to photograph together with the face is included in the whole image P. Therefore, if the facial image P is positioned on the lower side and the composition of the whole image P is portrait-mode composition, as illustrated in FIG. 7, the trimming means 40 does not automatically perform trimming. Consequently, it is possible to prevent the trimming means 40 from performing trimming that is not intended by the photographer, such as removing a part of the background by trimming, for example.

Figure 8:
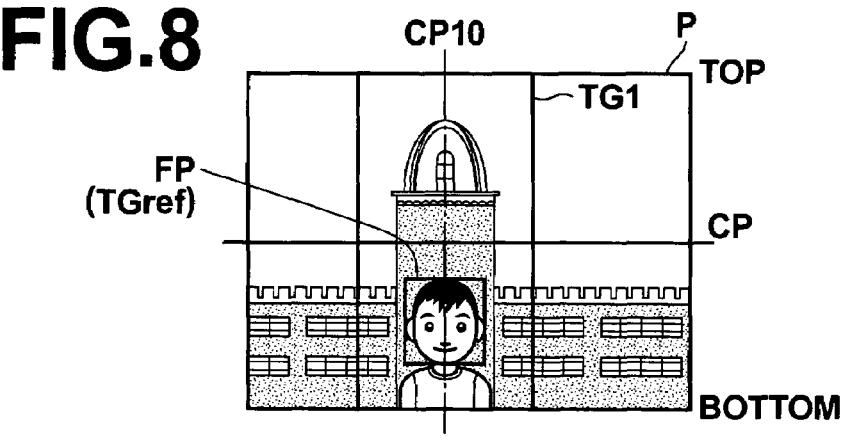
FIG. 8 is a schematic diagram illustrating an example of a trimming method when a facial image is positioned on the lower side of a whole image of landscape-mode composition.

Meanwhile, if the facial image FP is positioned on the lower side and the composition of the whole image P is landscape-mode composition, as illustrated in FIG. 8, the trimming means 40 automatically performs trimming by setting a trimming frame that includes a background that the photographer wanted to photograph together with the face, and which would probably be present on the upper side (top-side) of the face. Specifically, as illustrated in FIG. 8, if only a single face is present, the trimming means 40 sets a facial image FP as a facial area TGref. Then, the trimming means 40 extends the facial area TGref with respect to the lateral direction by a predetermined times (for example, twice) of the length of the facial image FP in the lateral direction so that the facial image FP (facial area TGref) is positioned at the center of a trimming frame with respect to the lateral direction. Further, with respect to the longitudinal direction, the trimming means 40 extends the facial area TGref until the facial area TGref reaches the upper end and the lower end of the whole image P. Consequently, a trimming frame TG1 with portrait-mode composition is set. Then, the trimming means 40 automatically performs trimming using the trimming frame TG1. Consequently, it is possible to automatically perform trimming so that the background that the photographer wanted to photograph together with the face is included. Hence, it is possible to automatically perform trimming so that the intention of the photographer is reflected in an image obtained by trimming.

In FIG. 8, a case in which a single facial image FP is present is used as an example. When a plurality of facial images FP is present, a trimming frame TG1 is set based on a facial area TGref in a manner similar to the examples illustrated in FIGS. 2, 5A, 5B and 5C. Further, as illustrated in FIG. 5C, a trimming frame TG10 may be set by extending the trimming frame TG1 so that a predetermined aspect ratio is satisfied. Alternatively, a trimming frame TG10 may be set by increasing the size of the trimming frame TG1 so that the ratio of the size of the trimming frame TG10 with respect to that of the whole image P becomes a predetermined ratio.

Figure 9:
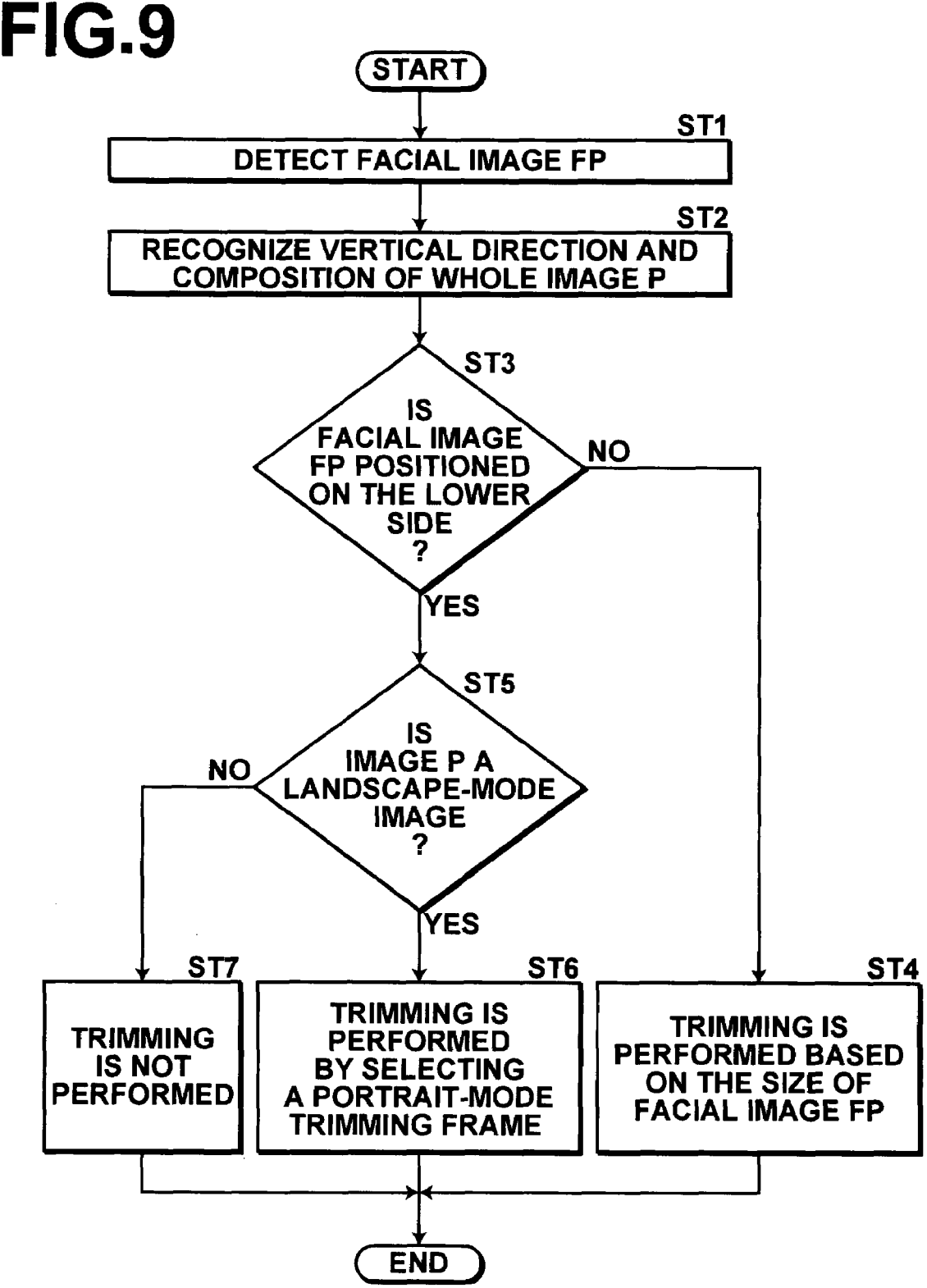
FIG. 9 is a flow chart showing an automatic trimming method according to a preferred embodiment of the present invention.

FIG. 9 is a flow chart illustrating a preferred embodiment of the automatic trimming method of the present invention. The automatic trimming method will be described with reference to FIGS. 1 through 9. First, the face detection means 10 detects a facial image FP in a whole image (step ST1, please refer to FIG. 2). Here, the face detection means 10 detects only facial images FP1 and FP2, of which the sizes are greater than or equal to a set threshold value. The face detection means 10 excludes a facial image FP3, of which the size is less than the set threshold value, from the detected faces.

Next, the vertical-direction judgment means 20 judges, based on the facial images FP1 and FP2, the vertical direction of the whole image P. Further, the composition discrimination means 30 discriminates whether the composition of the whole image P is portrait-mode composition or landscape-mode composition (step ST2, please refer to FIG. 3). Then, the facial-position judgment means 40 judges whether the facial image FP1 of the detected facial images FP1 and FP2 is positioned on the upper side of the whole image or on the lower side of the whole image (step ST3). Here, the facial image FP1 is a facial image that is positioned at the highest position among the detected facial images FP1 and FP2.

If it is judged that the facial image FP1 is positioned on the upper side, the trimming means 40 automatically performs trimming by setting, based on the sizes and the positions of the facial images FP1 and FP2, a trimming frame TG1 (TG10) (step ST4, please refer to FIGS. 5A, 5B and 5C). Meanwhile, if it is judged that the facial image FP1 is positioned on the lower side, and if the composition discrimination means 30 discriminates that the composition of the whole image P is landscape-mode composition (step ST5), trimming is automatically performed using the trimming frame TG1 that has portrait-mode composition (step ST6, please refer to FIG. 8). Alternatively, if it is judged that the facial image FP1 is positioned on the lower side, and if the composition discrimination means 30 discriminates that the composition of the whole image P is portrait-mode composition, the trimming means 40 does not automatically perform trimming (step ST7, please refer to FIG. 7).

In the aforementioned embodiment, if the composition of the whole image P is landscape-mode composition, and if the facial image FP is positioned on the lower side of the whole image, trimming is automatically performed by setting a trimming frame TG1 of portrait-mode composition based on the position of the facial image FP. Consequently, it is possible to set the trimming frame TG1 (TG10) by taking not only a person whom the photographer intended to photograph but also the background into consideration. Hence, it is possible to automatically perform trimming so that the intention of the photographer is reflected.

Further, in FIGS. 5A through 5C, if the facial-position judgment means 40 judges that the facial image FP is positioned on the upper side of the whole image P, the trimming means 40 determines the size of the trimming frame TG1 based on that of the facial image FP. If processing is performed in such a manner, it is possible to set a trimming frame TG1 based on the size of the facial image FP. Hence, it is possible to perform trimming so that the most appropriate composition is obtained.

Further, as illustrated in FIG. 5C, the trimming means 40 may set a trimming frame of which the size is a predetermined ratio with respect to the whole image P. Then, it is possible to prevent an image obtained by trimming from becoming too small.

Further, as illustrated in FIG. 7, if the facial-position judgment means 40 judges that the facial image FP is positioned on the lower side of the whole image P, and if the composition of the whole image P is judged to be portrait-mode composition, the trimming means 40 does not automatically perform trimming. If trimming is not automatically performed, it is possible to prevent a part of the background or the whole background, which the photographer wanted to photograph together with the face by intentionally selecting the portrait-mode composition, from being removed. Hence, it is possible to prevent the trimming means from performing trimming in a manner that is not intended by the photographer.

Further, as illustrated in FIG. 2, if the vertical-direction judgment means 20 detects a head portion in a facial image FP and judges that the head-portion side is a direction of the upper side, it is possible to accurately judge the vertical direction in an efficient manner. Further, when the whole image P includes a plurality of facial images FP, if the face detection means 10 detects only facial images FP1 and FP2, of which the values are greater than a set threshold value (0.4 times of the value of the largest facial image FP1), of the plurality of facial images FP1 through FP3, it is possible to prevent the small facial image FP3, in which the photographer does not have interest, from being included in the trimming frame TG1. Hence, it is possible to automatically perform trimming by regarding a person or persons in which the photographer has interest as a major subject.

The embodiment of the present invention is not limited to the aforementioned embodiment. For example, in the above embodiment, when a plurality of facial images FP1 and FP2 is present, the trimming means 40 sets the size of the trimming frame TG1 based on an average value of the sizes of the plurality of facial images FP1 and FP2. Alternatively, judgment may be made as to which facial image FP a major subject is by comparing the degree of blur or the like of the plurality of facial images FP1 and FP2 with each other. Then, a trimming frame TG may be set based on the facial image FP that has been judged to be the major subject.

Further, the trimming means 40 may determine the trimming frame TG by taking human body information and background information about a facial image FP into consideration in addition to the facial image FP, itself. Further, a method for setting different trimming frames TG based on respective different themes may be adopted. In the method for setting different trimming frames, different trimming frames may be set for a case in which the facial image FP is positioned on the upper side and for a case in which the facial image FP is positioned on the lower side. Further, for the case in which the facial image FP is position on the upper side, different trimming frames TG may be set for a case in which the composition of the whole image is portrait-mode composition and for a case in which the composition of the whole image is landscape-mode composition.

What is claimed is:

1. An automatic trimming method comprising the steps of:
    detecting a facial image in a whole image;
    judging the vertical direction of the whole image;
    discriminating whether the composition of the whole image is composition of which the vertical dimension is longer than the horizontal dimension thereof (portrait-mode composition) or composition of which the horizontal dimension is longer than the vertical dimension thereof (landscape-mode composition);
    judging whether the detected facial image is positioned on an upper side or on a lower side in the discriminated composition;
    if it is judged that the facial image is positioned on the upper side of the whole image, generating a trimmed image by performing trimming by determining the size and the position of a trimming frame based on the size and the position of the facial image; and
    if it is judged that the facial image is positioned on the lower side of the whole image, and if it is discriminated that the composition of the whole image is landscape-mode composition, generating a trimmed image by performing trimming by setting a trimming frame of portrait-mode composition based on the position of the facial image.

2. An automatic trimming apparatus comprising:
    a face detection unit for detecting a facial image in a whole image;
    a vertical-direction judgment unit for judging the vertical direction of the whole image;
    a composition discrimination unit for discriminating whether the composition of the whole image is composition of which the vertical dimension is longer than the horizontal dimension thereof (portrait-mode composition) or composition of which the horizontal dimension is longer than the vertical dimension thereof (landscape-mode composition);
    a facial-position judgment unit for judging whether the facial image detected by the face detection unit is positioned on the upper side of the whole image judged by the vertical-direction judgment unit or on the lower side of the whole image judged by the vertical-direction judgment unit; and
    a trimming unit for automatically performing trimming by setting a trimming frame based on the facial image detected by the face detection unit, wherein if the facial-position judgment unit judges that the facial image is positioned on the upper side of the whole image, the trimming unit performs trimming by determining the size and the position of the trimming frame based on the size and the position of the facial image, and wherein if the facial-position judgment unit judges that the facial image is positioned on the lower side of the whole image, and if the composition discrimination unit discriminates that the composition of the whole image is landscape-mode composition, the trimming unit performs trimming by setting a trimming frame of portrait-mode composition based on the position of the facial image.

3. An automatic trimming apparatus, as defined in claim 2, wherein the trimming unit sets the trimming frame so that the size of the trimming frame becomes a predetermined ratio with respect to that of the whole image.

4. An automatic trimming apparatus, as defined in claim 2, wherein if the facial-position judgment unit judges that the facial image is positioned on the lower side of the whole image, and if the composition discrimination unit discriminates that the composition of the whole image is portrait-mode composition, the trimming unit does not automatically perform trimming.

5. An automatic trimming apparatus, as defined in claim 2, wherein the vertical-direction judgment unit judges that a direction extending from the center of the facial image toward the head portion of the facial image is the upper side.

6. An automatic trimming apparatus, as defined in claim 2, wherein if the whole image includes a plurality of facial images, the face detection unit detects only a facial image or facial images of which the size or sizes is/are greater than a set threshold value in the whole image.

7. An automatic trimming apparatus, as defined in claim 2, wherein if the face detection unit detects a plurality of facial images, the trimming unit sets the size of the trimming frame based on an average value of the sizes of the plurality of facial images.

8. A non-transitory computer-readable medium on which is stored an automatic trimming program for causing a computer to execute trimming, the program comprising the procedures for:

detecting a facial image in a whole image;

judging the vertical direction of the whole image;

discriminating whether the composition of the whole image is composition of which the vertical dimension is longer than the horizontal dimension thereof (portrait-mode composition) or composition of which the horizontal dimension is longer than the vertical dimension thereof (landscape-mode composition);

judging whether the detected facial image is positioned on an upper side or on a lower side in the discriminated composition;

if it is judged that the facial image is positioned on the upper side of the whole image, trimming is performed by determining the size and the position of a trimming frame based on the size and the position of the facial image; and if it is judged that the facial image is positioned on the lower side of the whole image, and if it is discriminated that the composition of the whole image is landscape-mode composition, trimming is performed by setting a trimming frame of portrait-mode composition based on the position of the facial image.

* * * * *